US012782701B2

(12) United States Patent
Harke

(10) Patent No.: US 12,782,701 B2
(45) Date of Patent: Nov. 3, 2026

(54) LIGHT MODULATION DEVICE FOR A MICROSCOPE, MICROSCOPE AND METHOD FOR MODULATING A LIGHT BEAM

(71) Applicant: ABBERIOR INSTRUMENTS GMBH, Gottingen (DE)

(72) Inventor: Benjamin Harke, Gottingen (DE)

(73) Assignee: ABBERIOR INSTRUMENTS GMBH, Gottingen (DE)

( * ) Notice: Subject to any disclaimer, the term of this patent is extended or adjusted under 35 U.S.C. 154(b) by 288 days.

(21) Appl. No.: 18/627,069

(22) Filed: Apr. 4, 2024

(65) Prior Publication Data

US 2024/0248291 A1 Jul. 25, 2024

Related U.S. Application Data

(63) Continuation-in-part of application No. PCT/EP2022/078453, filed on Oct. 12, 2022.

(30) Foreign Application Priority Data

Oct. 13, 2021 (EP) .................................... 21202362

(51) Int. Cl.
*G02B 21/00* (2006.01)

(52) U.S. Cl.
CPC ................................ *G02B 21/0032* (2013.01)

(58) Field of Classification Search
CPC .. G02B 21/10; G02B 21/125; G02B 21/0032; G02B 27/58; G02B 21/0076;
(Continued)

(56) References Cited

U.S. PATENT DOCUMENTS 6,031,658 A 2/2000 Riza
2013/0083386 A1 4/2013 Harding et al.
(Continued)

FOREIGN PATENT DOCUMENTS

CN 111879234 B 11/2021
DE 10 2014 113 716 A1 3/2016
(Continued)

OTHER PUBLICATIONS

Kaplan et al., 'Acousto-optic lens with very fast focus scanning', Optics Letters, Jul. 15, 2001, pp. 1078-1080, vol. 26, No. 14.
(Continued)

*Primary Examiner* — Pinping Sun
*Assistant Examiner* — Ruby L Kauffman
(74) *Attorney, Agent, or Firm* — MOSER TABOADA

(57) ABSTRACT

The disclosure relates to a light modulation device for a microscope comprising a first active area of a wavefront modulator and a second active area of a wavefront modulator, wherein the first active area and the second active area are configured to modulate a wavefront of a light beam dependent on a polarization of the light beam, wherein the first active area and the second active area intersect a light path along which the light beam propagates, wherein the light modulation device comprises a first polarization switching element configured to rotate the polarization of the light beam between a first polarization direction and a second polarization direction upon receiving a switching signal to selectively modulate the wavefront of the light beam by the first active area and/or the second active area. The disclosure further relates to a microscope comprising the light modulation device and a method for modulating a light beam for microscopy.

17 Claims, 8 Drawing Sheets

(58) Field of Classification Search
CPC ................ G02B 26/06; G02B 27/0927; G02B 27/0933; G02B 27/286
See application file for complete search history.

(56) References Cited

U.S. PATENT DOCUMENTS

| | | | | |
|---|---|---|---|---|
| 2017/0052508 | A1 | 2/2017 | Brooker et al. | |
| 2017/0108684 | A1 * | 4/2017 | Fischer .............. | G02B 21/0076 |
| 2017/0123197 | A1 * | 5/2017 | Reuss ................ | G02B 21/0032 |
| 2020/0054485 | A1 | 2/2020 | Knox | |
| 2020/0310094 | A1 * | 10/2020 | Engelhardt ........ | G02B 21/0036 |
| 2021/0050703 | A1 * | 2/2021 | Zou ......................... | G02F 1/353 |
| 2021/0165199 | A1 * | 6/2021 | Heine ................ | G02B 21/0032 |
| 2021/0231991 | A1 | 7/2021 | Tam et al. | |
| 2021/0247600 | A1 * | 8/2021 | Siebenmorgen ..... | G02B 21/367 |
| 2021/0263295 | A1 | 8/2021 | Fiolka et al. | |
| 2022/0187584 | A1 | 6/2022 | Ha et al. | |

FOREIGN PATENT DOCUMENTS

| | | | | | |
|---|---|---|---|---|---|
| DE | 102023102378 | A1 | * | 8/2024 | ......... G02B 21/0032 |
| JP | S63311322 | A | | 12/1988 | |
| JP | H10141914 | A | | 5/1998 | |
| JP | H 11 32251 | | | 2/1999 | |
| JP | 2011197609 | A | * | 10/2011 | |
| JP | 2013/097132 | A | | 5/2013 | |
| JP | 2020030378 | A | | 2/2020 | |
| WO | WO 2019/115626 | A1 | | 6/2019 | |
| WO | WO 2020/198487 | A1 | | 10/2020 | |

OTHER PUBLICATIONS

Mermillon-Blondin et al., 'High-speed varifocal imaging with a tunable acoustic gradient index of refraction lens' Optics Letters, Sep. 15, 2008, pp. 2146-2148. vol. 33, No. 18.

S. Hou et al., 'Real-time 3D single molecule tracking', Nature Communications, 2020, pp. 3607-3617, 17(11), https://doi.org/10.1038/s41467-020-17444-6 | www.nature.com/naturecommunications.

G. Konstantinou et al., 'Dynamic wavefront shaping with an acousto-optic lens for laser scanning microscopy', Optics Express, Mar. 21, 2016, pp. 6283-6299, vol. 24, No. 6, DOI:10.1364/OE.24.006283.

F. Balzarotti et al., 'Nanometer resolution imaging and tracking of fluorescent molecules with minimal photon fluxes', arXiv:1611.03401 [physics.optics], 85 pages, 2016.

K.C. Gwosch et al., 'MINFLUX nanoscopy delivers 3D multicolor nanometer resolution in cells', Nature Methods, 2020, pp. 217-224, 17 (2), https://doi.org/10.1038/s41592-019-0688-0.

R. Schmidt et al., 'MINFLUX nanometer-scale 3D imaging and microsecond-range on a common fluorescence microscope', Nature Communications, 2021, pp. 1478-1490, 12(1), https://doi org/10.1038/s41467-021-21652-z, www.nature.com/naturecommunications.

C K Lee et al. , A head-mounted compressive three-dimensional display system with polarization-dependent focus switching, Proc. of SPIE, 2016, 7 pages, vol. 10022 10220D-1, doi: 10.1117/12.2247591.

M. Lenz et al. 3-D stimulated emission depletion microscopy with programmable aberration correction, Journal of Biophotonics 7, 2014, pp. 29-36, No. 1-2, DOI 10.1002/jbio.201300041.

J Marquard, Digital light deflection and electro-optical laser scanning for STED nanoscopy, Dissertation, 2017, 79 pages.

T Deguchi et al., Fast and robust 3D Minflux excitation with a variable phase plate, bioRxiv, 2023, 18 pages, doi:10.1101/2023.10.31.564945.

M K Geismann et al., A Fast Interferometric Beam Shaper for Multi-Emitter 3D Minflux, bioRxiv, 2023, 22 pages, doi:10.1101/2023.12.09570565.

European Examination Report for Application No. 22798356.6 dated Aug. 20, 2025.

* cited by examiner

LIGHT MODULATION DEVICE FOR A MICROSCOPE, MICROSCOPE AND METHOD FOR MODULATING A LIGHT BEAM

CROSS-REFERENCE TO RELATED APPLICATIONS

The present application is a continuation-in-part application and claims priority to and the benefit of International Patent Application No. PCT/EP2022/078453, filed on Oct. 12, 2021, which claims priority to EP Patent Application Ser. No. 21202362.6 filed on Oct. 13, 2021. Each of these applications is incorporated herein by reference in its entirety.

TECHNICAL AREA

The present disclosure relates to a light modulation device for a microscope, a microscope comprising the light modulation device and a method for modulating a light beam for microscopy. The microscope and the light beam may be used for microscopic imaging of a sample or for microscopic localization of single molecules or particles in a sample. The light modulation device modulates the wavefront (e.g., the phase or amplitude distribution) of the light beam, e.g., to shape and/or position the light beam, particularly a focus of the light beam.

PRIOR ART

Wavefront modulation has been used for various purposes in microscopy. For example, the phase distribution of a STED (stimulated emission depletion) light beam can be adjusted in a in a pupil plane of the objective, such that a light distribution with a central intensity minimum is generated at the focus of the light beam. In the presence of additional excitation light, actively emitting fluorophores in the observed sample can be confined to a central region of the donut which is significantly smaller than the diffraction limit. In this manner, super-resolution can be achieved.

A similar approach is used in MINFLUX microscopy to generate a hollow focus of excitation light (F. Balzarotti et. al., "Nanometer resolution imaging and tracking of fluorescent molecules with minimal photon fluxes", https://arxiv.org/abs/1611.03401) During MINFLUX, the intensity minimum of this focus is moved in a pattern relative to the sample in the vicinity of a single fluorophore (which has been identified and localized with lower precision using an independent localization method), and fluorescence photon counts are recorded for each position of the pattern. A position estimate of the fluorophore can then be determined from the photon counts and the corresponding positions. When applied iteratively, this procedure can achieve localization accuracies in the range of 1-2 nm, i.e., molecular resolution.

Suitable wavefront modulators for the described applications include transmissive phase filters (phase plates) with a fixed phase pattern and spatial light modulators, e.g., comprising pixels with programmable phase values.

In certain instances, it is desirable to illuminate the sample simultaneously or in fast succession with two or more light distributions of different shapes.

For example, in STED microscopy, lateral as well as axial resolution can be improved by combining two incoherent STED foci, a donut and a bottle-beam (also referred to herein as '3D donut'). Whereas a donut is characterized by a very sharp intensity minimum in the lateral direction (improving lateral resolution), a bottle beam, which comprises areas of high STED intensity above and below the focus, advantageously improves axial resolution.

An optical setup to generate such a combination of different STED foci using a single spatial light modulator has been described by M. Lenz et al.: '3-D stimulated emission depletion microscopy with programmable aberration correction' J Biophotonics 7, No. 1-2, 29-36 (2014).

In this method, a STED beam is separated into two orthogonally polarized incoherent beams using a polarization-maintaining single mode fiber, and the two beams are subsequently projected onto two separate active areas of a spatial light modulator displaying different phase patterns. The first active area is imaged onto the second active area by focusing the beam emerging from the first active area onto a mirror in a 2F configuration relative to the surface of the spatial light modulator. A quarter-wave plate positioned in the beam path between the spatial light modulator and the mirror is passed twice by the light beam to rotate the polarization by 90°. In this manner, the component of the beam initially matching the polarization sensitive pattern of the first active area is modulated by the first active area, and its polarization is subsequently rotated by 90°, such that its wavefront is unaffected by the second active area. Vice versa, the other component is not modulated by the first active area since its polarization does not match the pattern on the first active area but is modulated by the second active area after passing the quarter-wave plate. By imaging the two areas of the spatial light modulator onto each other, a lateral shift between the two light beams due to diffraction on the blazed grating of the spatial light modulator is compensated, such that the partial beams are perfectly aligned. By an appropriate adjustment of the phase patterns of the spatial light modulator, aberrations can be corrected in parallel with beam shaping.

An alternative system using exclusively collimated beams is described in DE 10 2014 113 716 A1. Here, two orthogonally polarized beam components are also projected on two separate active areas of a spatial light modulator displaying different phase-modulating patterns. However, a reflective substrate attached to a quarter wave plate is placed closely to the spatial light modulator without any focusing optics in between, which results in a less error-prone and highly compact design. Although a lateral shift between the two components occurs in this setup, the shift is very small due to the close distance between the mirror and the active surface of the spatial light modulator. In addition, the remaining lateral shift can be compensated by adjusted phase patterns.

Another embodiment described in DE 10 2014 113 716 A1 consists of two transmissive phase filters displaying the phase patterns to construct a donut and a bottle beam from the two components of the light beam and a half-wave plate arranged between the phase filters to rotate the polarization by 90° as described above.

DE 10 2014 113 716 A1 further mentions that the quarter wave plate or half wave plate can be completely omitted if the phase filters have crossed polarization directions.

However, a further advantage of rotating the polarization between the two active areas is that a chromatic quarter-wave plate or half-wave plate can be used. In this manner, the beam path including the spatial light modulator can be used for a further beam of different wavelength (e.g., an excitation beam), which is not polarization-rotated by the chromatic quarter-wave or half-wave plate. If this beam initially has a polarization not matching the spatial light modulator, it is unaffected by both the first active area and the second active area.

Switching between different beam shapes has been described, e.g., for a variant of 3D MINFLUX microscopy (K. C. Gwosch et al.: "MINFLUX nanoscopy delivers 3D multicolor nanometer resolution in cells", Nature Methods 17, 217-224 (2020). In this method, a single fluorophore is pre-localized by moving a Gaussian-shaped excitation beam over the sample in a pre-defined pattern, followed by a high-accuracy localization using a 3D donut.

WO 2020/198487 A1 describes a method, in which a reference signal for background correction in STED microscopy is obtained by providing additional light intensity at the central minimum of a donut-shaped STED focus. This is achieved by altering the circular polarization of the light beam in front of the objective lens.

In many applications in microscopy, fast switching of beam shapes would be desirable. Switching by mechanical actuation of parts is too slow for many purposes. Using programmable spatial light modulators, it is possible to alter the displayed phase patterns in time, but switching speeds are limited to the millisecond time range, which is still too slow for many purposes.

Objective Problem

Therefore, the objective of the present disclosure is to provide a light modulation device for a microscope which can switch between different wavefront modulation patterns at high speed.

Solution

This objective is attained by the light modulation device, the microscope and the method according to the independent claims. Favorable embodiments are specified in the dependent claims and described hereafter.

DESCRIPTION

A first aspect of the present disclosure relates to a light modulation device for a microscope comprising a first active area of a wavefront modulator and a second active area of a wavefront modulator. The first active area and the second active area are either comprised in a single wavefront modulator, or the first active area is comprised in a first wavefront modulator and the second active area is comprised in a second wavefront modulator. In particular, the first active area and the second active area are non-overlapping.

The first active area and the second active area are configured to modulate a wavefront of a light beam, particularly a linearly polarized light beam, dependent on the polarization of the light beam. In other words, the first active area and the second active area modulate the wavefront of a component of the light beam polarized in a preferred direction, but do not modulate a component of the light beam which is polarized orthogonally to the preferred direction.

Modulating the wavefront of the light beam particularly comprises modulating a spatial phase distribution and/or a spatial amplitude distribution of the light beam. In case the phase distribution of the light beam is modulated, the first active area and the second active area are particularly arranged in a plane which is conjugated to a pupil plane of an objective lens of a microscope, which focuses the light beam into or onto a sample.

In particular, to achieve a modulation of its wavefront, the light beam may be diffracted, reflected or transmitted by the first active area and the second active area.

In particular, the light beam is linearly polarized. If, e.g., the polarization of the light beam matches the preferred direction of the first active area when reaching the first active area but is orthogonal to the preferred direction of the second active area when reaching the second active area, the wavefront of the light beam is selectively modulated by the first active area.

In particular, the light beam is an illumination light beam configured to illuminate the sample. For example, the illumination light beam may be an excitation light beam configured to excite emitters (e.g. fluorophores, light reflecting or light scattering particles or the like) in the sample.

A light path, along which the light beam propagates, intersects the first active area and the second active area. That is, e.g., the first active area and the second active area may be arranged on an optical axis of the light beam, particularly in case the first active area and the second active area are formed by transmissive wavefront-modulating elements, such as phase plates. Alternatively, particularly in case the first and second active areas are formed by diffractive or reflective surfaces, a mirror or similar reflective element may be provided in the light path between the first active area and the second active area to direct the light beam along the light path.

In the light path between the first active area and the second active area, the light beam may be focused (e.g., to a mirror to image the first active area and the second active area onto each other as described, e.g., in the prior art document M. Lenz et al.: '3-D stimulated emission depletion microscopy with programmable aberration correction' J Biophotonics 7, No. 1-2, 29-36 (2014)), or the light beam may be collimated in the light path between the first active area and the second active area as described, e.g., in the prior art document DE 10 2014 113 716 A1.

The light modulation system comprises a first polarization switching element configured to rotate the polarization of the light beam between a first polarization direction and a second polarization direction upon receiving a switching signal to selectively modulate the wavefront of the light beam by the first active area and/or the second active area.

In particular, the first polarization direction is perpendicular to the second polarization direction. This has the advantage that the wavefront of a light beam which is linearly polarized in the first direction is only modulated by the first active area but completely unaffected by the second active area, and vice versa.

E.g., the light beam may be initially linearly polarized, such that its wavefront will be modulated by the first active area, but not by the second active area. Upon providing a switching signal to the first polarization switching element, the polarization of the light beam may be rotated by a desired angle (e.g., 90°), such that the light beam is unaffected by the first active area, but such that its wavefront is modulated by the second active area.

By means of the first polarization switching element, the polarization of the light beam can be adjusted quickly to selectively achieve wavefront modulation of the light beam by the pattern displayed on the first active area or the second active area of the wavefront modulator. Thereby, in particular, switching between different beam shapes may be achieved on a time scale which is much faster than an actuation of movable parts or re-programming of a spatial light modulator.

For example, in scanning microscopy this concept may be applied to switch between different beam shapes line by line or even pixel by pixel. If the phase or amplitude patterns displayed on the first active area and the second active area are adjustable (such as e.g., in case of a phase-modulating spatial light modulator comprising programmable pixels), the device can be applied to quickly switch between arbitrary beam shapes for various applications.

In certain embodiments, the first polarization switching element (and optionally also the second polarization switching element described below) is an electro-optic device (e.g., a Pockels cell, which rotates the polarization of the light beam due to the electro-optic effect. Advantageously, such electro-optic devices allow very fast switching and/or allow an adjustment of the angle of polarization rotation.

In certain embodiments, the first polarization switching element (and optionally also the second polarization switching element described below) comprises an electrooptic switching element, particularly a Pockels cell.

In certain embodiments, the first polarization switching element comprises at least one acousto-optic modulator (AOM). In certain embodiments, the first polarization switching element comprises a first acousto-optic modulator configured to modulate an intensity of a first linearly polarized light beam having a first polarization direction, a second acousto-optic modulator configured to modulate an intensity of a second light beam having a second polarization direction perpendicular to the first polarization direction, and a control device configured to control the first acousto-optic modulator and the second acousto-optic modulator to switch between the first light beam and the second light beam. For example, switching between the beams may comprise switching between a first state, in which the first AOM completely blocks the first light beam (and the second AOM may particularly leave the intensity of the second light beam unaffected), and a second state, in which the second AOM completely blocks the second light beam (while the first AOM may particularly leave the intensity of the first light beam unaffected). Compared to switching with an electrooptic element such as a Pockels cell, this embodiment may be more robust and economically feasible.

In certain embodiments, the light modulation device comprises a polarizing beam splitter (PBS) configured to split an (unpolarized) incoming light beam into the first linearly polarized light beam having the first polarization direction and the second linearly polarized light beam having the second polarization direction perpendicular to the first polarization direction. In particular, the incoming light beam may be a laser beam generated by a laser source. The first and the second light beam may then be guided in parallel beam paths, in which the first AOM and the second AOM are arranged to switch between the first light beam and the second light beam.

In certain embodiments, the light modulation device comprises a beam combiner, particularly a polarizing beam combiner, configured to combine the first light beam and the second light beam after being modulated by the first AOM and/or the second AOM. In this manner, the first and/or the second light beam (depending on the switching mode) can be coupled into a common beam path.

In certain embodiments, the light modulation device comprises a fiber coupler configured to couple the first light beam and/or the second light beam (depending on the switching mode) into an optical fiber.

In certain embodiments, the first polarization switching element comprises a first electrooptical modulator (EOM). In particular, a modulation axis of the first electrooptical modulator is arranged at an angle of 45° with respect to a polarization direction of the linearly polarized light beam, such that a phase shift between a first polarization component and a second polarization component of the light beam is caused, wherein the first polarization component and the second polarization component comprise orthogonal polarization directions. By controlling a voltage of the first EOM, the amount of the phase shift (that is the phase angle by which the components are shifted) may be controlled.

In certain embodiments, the first polarization switching element comprises a first EOM and a polarization rotator, particularly a quarter wave plate, arranged in a light path downstream of the first EOM. In particular, a modulation axis of the first EOM is arranged at an angle of 45° with respect to a polarization direction of the linearly polarized light beam, and a principal axis of the polarization rotator is arranged parallel to the polarization direction of the light beam (i.e., at an angle of 45° with respect to the modulation axis of the first EOM). In this manner, a light beam with two orthogonal polarization components may be generated, wherein the relative amplitude of the components may be controlled by controlling the voltage of the first EOM.

In certain embodiments, the first polarization switching element further comprises a second electrooptical modulator (EOM) comprising a modulation axis which is parallel to the (initial) polarization direction of the light beam. By controlling the voltage of the second EOM, the relative phase of the two components of the light beam may be controlled.

Using the different configurations of the EOM(s) described above, the modulated light beam comprising the phase- and/or amplitude shifted orthogonally polarized components may be used, for example to modulate the spatial phase and/or amplitude distribution of the two components differently, e.g., with the wavefront modulator of the light modulation device.

In certain embodiments, the polarization specificity of the wavefront modulator may match the (initial) polarization direction of the light beam and the light modulation device may be configured such that the light beam is modulated in a single pass of the wavefront modulator (i.e., single transmission through or reflection or diffraction from an active area of the spatial light modulator). In this case, the first active area and the second active area of the wavefront modulation may both simultaneously modulate the light beam. This may be achieved, e.g., if the first active area and the second active area are partial areas of a cross-section area of the light beam.

In particular, when combined with the first EOM for controlling the phase shift between the first component and the second component of the light beam, the first active area and the second active area may be arranged such that a first part of the light beam is modulated by the first active area and the second part of the light beam is modulated by the second active area. For example, the first active area may display a phase pattern acting as a polarization rotator, e.g., a halfwave plate, such that the polarization of the light beam is rotated by 90°, while the second active area does not modulate the light beam. In this manner, the component of the light beam that has been phase shifted by the first EOM is rotated in the respective part of the beam.

In certain embodiments, the light modulation device may further comprise a polarizer in a light path behind the first EOM and the wavefront modulator comprising the first active area and the second active area.

In particular, when the light beam is subsequently focused by an objective lens, the two components of the light beam will interfere to form a desired intensity distribution at the focus, in particular an intensity distribution with a local minimum, ideally an intensity zero, at the focus. As an example, by controlling the phase shift of the components by the first EOM an axial position or a lateral position of the focus of the light beam (in particular an axial position of the local minimum) may be quickly shifted and/or an overall intensity distribution at the focus may be quickly shaped in a desired manner.

According to another embodiment, particularly, when using a double pass configuration of the wavefront modulator, where the respective components of the light beam are modulated in two subsequent interactions with the wavefront modulator (or different wavefront modulators), the light modulation device may further comprise a polarization rotator, particularly a passive polarization rotator, such as a halfwave plate, arranged in a beam path between the wavefront modulator and the polarizer, wherein the polarization rotator is configured and arranged such that the two orthogonal components of the light beam are rotated such that they are oriented at an angle of 45° with respect to the polarizer, such that the two components are parallel to each other after passing through the polarizer. In this manner, the modulated components can be combined, such that after focusing of the light beam by an objective lens, the components interfere to form a desired intensity distribution at the focus. For example, by controlling the relative amplitude and/or a phase shift between the components using the first EOM and/or the second EOM described above, the axial or lateral position of the focus and/or the overall intensity distribution may be adjusted in a desired manner. This may be applied, e.g. in a MINFLUX method, where an intensity distribution with a local minimum, ideally an intensity zero, is applied to localize or track a single emitter.

Especially when applied for focusing, the light modulation device according to the present disclosure is particularly advantageous for a 3D MINFLUX microscope.

MINFLUX microscopy (a specific form of localization microscopy) is defined here as a method, in which singular emitters (e.g., fluorophores, nanoparticles or the like) are illuminated by an illumination light having an intensity distribution comprising a local intensity minimum, particularly an intensity zero, at a focus in the sample, wherein the local minimum is placed at illumination positions in a vicinity of a presumed position of a singular emitter, wherein light emissions of the singular emitter are recorded for the illumination positions, and wherein a position of the singular emitter is estimated from the illumination positions and the corresponding recorded light intensities, or alternatively, wherein light emissions of the singular emitter are recorded for different shapes and/or arrangements of the intensity distribution. MINFLUX may be applied in particular for generating high resolution images or several localized emitters in the sample or tracking of single emitters.

In 3D MINFLUX using the light modulation device according to the present disclosure, the local minimum may be placed at illumination positions at different axial positions along an optical axis of the objective focusing the illumination light (that is different focal planes) or different lateral positions in a focal plane or the intensity distribution may be shaped or arranged differently. For MINFLUX microscopy, due to the achievable super-resolution in the low nanometer range, in particular, the necessary displacement along the optical axis is small (typically on the order of tens to hundreds of nanometers) compared to conventional 3D microscopy (e.g., using confocal laser scanning microscopy). Therefore, the effect of aberrations that might be introduced due to the change in optical path length of the illumination light by the light modulation device according to the present disclosure when used for axial focus shifting is typically much smaller than for conventional microscopy. In addition, if the local minimum of the intensity distribution is not severely affected by the aberrations, position estimation using a MINFLUX method may still be possible in contrast to conventional imaging.

Emitters are defined here as entities acting as point sources of light (e.g., fluorescence light or reflected illumination light) in the sample. These emitters are "singular" if they are optically separable. This may be the case if emitters in a bright state, in which they are emitting light, have a distance above the diffraction limit to neighboring emitters at the time of a measurement. Emitters in a dark, non-emitting state may be arranged at shorter distances. Emitters of different emission spectra or lifetimes may also be separable, i.e., singular, if they can be distinguished by spectral separation or lifetime analysis, or the like.

In certain embodiments, the first active area is configured to modulate the wavefront of the light beam if the light beam is polarized in the first polarization direction and the second active area is configured to modulate the wavefront of the light beam if the light beam is polarized in the second polarization direction. In other words, the first active area and the second active area have different preferential directions. This can be achieved either by two separate wavefront modulators or by a single wavefront modulator having two surfaces of different polarization selectivity. In particular, the first polarization direction is perpendicular to the second polarization direction.

In certain embodiments, the light path, particularly a single light path, along which the light beam propagates intersects the first active area and the second active area. This has the advantage that the light modulation device takes up less space.

In certain embodiments, an order in which the light beam impinges on the first active area and the second active area is identical regardless of the polarization of the light beam. Thereby, a more compact light modulation device may be constructed.

In certain embodiments, the light modulation device comprises a polarization modifying element (e.g., a half wave plate, a quarter wave plate or an electrooptical element) configured to rotate the polarization of the light beam, particularly by 90°, wherein the polarization modifying element is arranged in the light path between the first active area and the second active area.

According to this embodiment, the light beam may be selectively modulated by the first and the second active area, even if the first and the second active area have the same preferential polarization direction. Therefore, the first active area and the second active area may be provided as partial areas of a single active surface of a single wavefront modulator, which results in a reduction of costs and complexity of the system.

In certain embodiments, the polarization modifying element is configured to rotate the polarization of the light beam in a wavelength dependent manner.

In other words, the polarization modifying element is chromatic. By means of a chromatic polarization modifying element, a further light beam of an appropriate wavelength may be used in parallel to the light beam in the same beam path, while the wavefront of the further light beam is unaffected (i.e., not modulated) by the first and the second active area.

In certain embodiments, the polarization modifying element is a passive polarization modifying element, particularly a half wave plate, which is passed once by the light beam between the first active area and the second active area or a quarter wave plate, which is passed twice by the light beam between the first active area and the second active area. A passive polarization modifying element in the meaning used in the present specification modifies the polarization of the light beam without applying a (e.g., electric) switching signal.

In certain embodiments, the polarization modifying element is an active polarization modifying element, particularly an electrooptic element, such as e.g., a Pockels cell. The term 'active polarization modifying element' as used herein describes a polarization modifying element which rotates the polarization of the light beam upon receiving a switching signal.

In certain embodiments (particularly in case the light modulation device comprises a polarization modifying element in the light path between the first active area and the second active area, as described above) both the first active area and the second active area are configured to modulate the wavefront of the light beam if the light beam is polarized in the first polarization direction. In certain embodiments, both the first active area and the second active area are configured to modulate the wavefront of the light beam if the light beam is polarized in the second polarization direction. In particular, the first active area and the second active area are jointly formed by a single wavefront modulator.

In certain embodiments, the light modulation device comprises a second polarization switching element configured to rotate the polarization of the light beam between the second polarization direction and the first polarization direction (e.g., back from the second polarization direction to the first polarization direction) after the wavefront of the light beam has been modulated by the first active area and/or the second active area.

In certain embodiments, the first polarization switching element and/or the second polarization switching element comprises a switching rate of at least 1 kHz, particularly at least 2 kHz, more particularly at least 5 kHz.

In certain embodiments, the first polarization switching element and/or the second polarization switching element comprises a switching rate of at least 0.1 kHz, at least 0.2 kHz, at least 0.3 kHz, at least 0.4 kHz, at least 0.5 kHz, at least 0.6 kHz, at least 0.7 kHz, at least 0.8 kHz, at least 0.9 kHz, at least 1 kHz, at least 1.1 kHz, at least 1.2 kHz, at least 1.3 kHz, at least 1.4 kHz, at least 1.5 kHz, at least 1.6 kHz, at least 1.7 kHz, at least 1.8 kHz, at least 1.9 kHz, at least 2 kHz, at least 2.1 kHz, at least 2.2 kHz, at least 2.3 kHz, at least 2.4 kHz, at least 2.5 kHz, at least 2.6 kHz, at least 2.7 kHz, at least 2.8 kHz, at least 2.9 kHz, at least 3 kHz, at least 3.1 kHz, at least 3.2 kHz, at least 3.3 kHz, at least 3.4 kHz, at least 3.5 kHz, at least 3.6 kHz, at least 3.7 kHz, at least 3.8 kHz, at least 3.9 kHz, at least 4 kHz, at least 4.1 kHz, at least 4.2 kHz, at least 4.3 kHz, at least 4.4 kHz, at least 4.5 kHz, at least 4.6 kHz, at least 4.7 kHz, at least 4.8 kHz, at least 4.9 kHz, or at least 5 kHz.

In certain embodiments, the first polarization switching element and/or the second polarization switching element is an electro optic device, particularly a Pockels cell.

In certain embodiments, the first polarization switching element and/or the second polarization switching element may be switchable fiber coupler configured to selectively couple different linear polarized light components (e.g., generated by different lasers) into a light conducting fiber. Alternatively, in certain embodiments, the first polarization switching element may comprise at least one switchable shutter or light attenuator, e.g., an acoustooptic modulator configured to selectively attenuate linear polarized light components (e.g., generated by different lasers).

In certain embodiments, the first active area and the second active area are comprised in a spatial light modulator comprising a plurality of adjustable pixels.

In certain embodiments, the polarization modifying element is a passive element, e.g., a λ/2 plate, configured to rotate the polarization of the light beam independently of a switching signal.

In certain embodiments, the polarization modifying element is a λ/2 plate configured such that the light beam is transmitted once by the λ/2 plate, or the polarization modifying element is a λ/4 plate configured such that the light beam is transmitted twice by the λ/4 plate.

In certain embodiments, the first active area is configured to display a first modulation pattern and the second active area is configured to display a second modulation pattern. When the light beam is transmitted, reflected or diffracted by the first or second active area, the modulation pattern results in a wavefront modulation of the light beam.

In certain embodiments, the light modulation device comprises a control device configured to control the first active area and the second active area, such that the first active area displays the first modulation pattern, and the second active area displays the second modulation pattern. This is possible, e.g., using a spatial light modulator with controllable pixels.

In certain embodiments, the first modulation pattern and the second modulation pattern are adapted to adjust an axial position of a focus of the light beam. The focus is particularly generated by an objective lens of a microscope. E.g., in case the first and second modulation patterns modulate the phase distribution of the light beam, a defocus may be introduced to the light beam by the first and/or the second modulation pattern in a similar manner to aberration correction as described in the prior art. Specifically, the first and/or the second modulation pattern may be a phase pattern reflecting a Zernike polynomial describing a defocus aberration. A defocus may be introduced by one of the modulation patterns, whereas the other modulation pattern particularly does not affect the phase and/or amplitude distribution of the light beam, or the first and the second modulation pattern may introduce defoci of different extent, resulting in a shift of the focus.

The resulting shift of the axial focus position may be used, e.g., in 3D scanning of a sample with the light beam, e.g., in confocal laser scanning microscopy, or to move a local minimum of a light distributions between different positions forming a 3D pattern (such as in 3D MINFLUX microscopy).

In certain embodiments, the first modulation pattern and the second modulation pattern are adapted, such that the wavefront of the light beam is modulated in an identical fashion regardless of the polarization of the light beam. In particular, the first modulation pattern and the second modulation pattern may be identical (or identical except for additional corrections of a lateral shift or aberrations) according to this embodiment.

This embodiment may be used, e.g., in microscopic applications, in which polarization switching is used for other purposes (e.g., guiding the light beam along different light paths by polarizing beam splitters) to ensure that an identical beam shape is achieved regardless of the polarization direction.

In certain embodiments, at least one of the first modulation pattern and the second modulation pattern is adapted to generate a light distribution comprising a local intensity minimum at a focus of the light beam. An example of such a light distribution is a donut (2D donut) or a bottle beam (3D donut), as known, e.g., from STED and MINFLUX microscopy. A typical 2D donut can be generated, e.g., by a vortex-shaped phase pattern in a plane conjugated to the objective pupil running gradually from phase values of zero to 2π. A bottle beam can be constructed by a top-hat shaped phase pattern in a pupil-conjugated plane. The light beam may be additionally circularly polarized (e.g., by a λ/4 plate behind the objective lens) to generate these light distributions.

In certain embodiments, the first modulation pattern is adapted to generate a light distribution comprising a local intensity maximum at a focus of the light beam, particularly a Gaussian shaped light distribution and the second modulation pattern is adapted to generate the light distribution comprising the local intensity minimum at the focus, particularly a donut-shaped light distribution or a bottle beam shaped light distribution. In particular, a Gaussian shaped light distribution can be achieved by a regularly focused beam. In this case, the first modulation pattern is particularly a 'null pattern' which does not modulate the phase distribution of the light beam.

For example, switching between an excitation light distribution comprising a local maximum and an excitation light distribution comprising a local minimum may be applied in MINFLUX microscopy to switch between pre-localization of a fluorophore using, e.g., a Gaussian shaped light distribution as described in the prior art, and a MINFLUX localization sequence using, e.g., a donut-shaped light distribution.

In certain embodiments, the first modulation pattern is adapted to generate a first light distribution, and the second modulation pattern is adapted to generate a second light distribution, wherein both the first light distribution and the second light distribution comprise a local minimum at a focus of the light beam, wherein the first light distribution is different from the second light distribution, wherein particularly the first light distribution is donut-shaped and the second light distribution is bottle beam shaped.

In this manner, e.g., fast switching between a 2D donut and a 3D donut in STED microscopy can be achieved.

In certain embodiments, the first light distribution and the second light distribution each comprise a low-intensity region including and/or surrounding the local intensity minimum, wherein a light intensity is below a threshold value in the low-intensity region, and wherein a volume of the low-intensity region of the first light distribution is different, particularly by 10% or more, from the volume of the low-intensity region of the second light distribution.

In other words, one of the light distributions comprises a broader region of low intensity compared to the other distribution, e.g., due to a different steepness of the intensity distribution adjacent to the local intensity minimum.

For instance, 2D donuts of different broadness can be achieved by displaying a phase pattern in a pupil-conjugated plane running from phase values between zero and different even multiples of π (e.g., 2π, 4π, 6π, 8π, or 10π).

Whereas in STED microscopy, the region of low intensity around the minimum of the STED light distribution should be as small as possible to optimize spatial resolution, a broader distribution may be preferred in other applications, such as, e.g., MINFLUX microscopy in an envelope of STED light to reduce background fluorescence. Using the described embodiment, e.g., fast switching between STED light distributions of different 'broadness' can be achieved.

In certain embodiments, the at least one of the first light distribution and the second light distribution comprises additional light intensity at the local minimum (wherein the term 'additional' is meant relative to the other light distribution).

E.g., additional light intensity at the local minimum of a 2D donut-shaped light distribution can be achieved, e.g., by introducing a slight disturbance of a vortex-shaped phase pattern leading to imperfect destructive interference at the focus.

This additional light intensity at the minimum can be applied to obtain a reference signal for background correction in STED microscopy, as described, e.g., in WO 2020/198487 A1. Fast switching between the regular STED distribution and the 'reference distribution' is highly desirable in this application, to perform background correction during scanning over the sample, e.g., line-wise or pixel-wise.

A second aspect of the disclosure relates to a microscope, particularly a light microscope, more particularly a super resolution microscope, comprising a light modulation device according to the first aspect. A super resolution microscope is a light microscope configured to a achieve a resolution below the diffraction limit of light.

In certain embodiments, the microscope comprises a light source configured to provide the light beam, an objective lens configured to focus the light beam into or onto a sample, and a detector configured to detect light emanating from the sample (e.g., light reflected by particles in the sample or luminescence, e.g., fluorescence light generated by emitters in the sample in response to excitation light).

In certain embodiments, the microscope comprises a first light source configured to illuminate the sample with excitation light (to excite emitters in the sample) and/or a second light source configured to illuminate the sample with depletion light (to deplete luminescence of the emitters, e.g., by STED). In particular, the microscope comprises a wavefront modulator configured to generate a light distribution of the excitation light and/or the depletion light comprising a local intensity minimum at the focus.

In certain embodiments, the microscope comprises a scanner configured to move the focus of the light beam through or over the sample.

In certain embodiments, the microscope comprises a wavefront modulator configured to generate an excitation light distribution comprising a local minimum at the focus, a deflection device, particularly an electro optic deflection device or an acousto-optic deflection device, configured to move the minimum of the excitation light distribution through or over the sample in a pattern, and a processing device configured to estimate a position of a single emitter in the sample based on a plurality of detection signals (e.g., photon counts) obtained by the detector at respective positions of the minimum and the corresponding positions of the minimum. In particular, such a microscope may also be designated 'MINFLUX microscope' herein, and the corresponding method may be termed 'MINFLUX microscopy'.

A third aspect of the disclosure relates to a method for modulating a light beam for microscopy, particularly using the light modulation device according to the first aspect and/or the microscope according to the second aspect, wherein a light beam, particularly a linearly polarized light beam, is provided, and the light beam is directed along a light path intersecting a first active area of a wavefront modulator and a second active area of a wavefront modulator, particularly non-overlapping with the first active area, wherein the first active area and the second active area are configured to modulate a wavefront of the light beam dependent on a polarization of the light beam.

The polarization of the light beam is rotated between a first polarization direction and a second polarization direction upon receiving a switching signal to selectively modulate the wavefront of the light beam by the first active area and/or the second active area, wherein particularly the first polarization direction is perpendicular to the second polarization direction.

In certain embodiments, the method comprises (particularly after modulating the wavefront by the first active area and before modulating the wavefront by the second active area) rotating the polarization of the light beam, particularly by 90°.

In certain embodiments, a first modulation pattern is displayed by the first active area and/or a second modulation pattern is displayed by the second active area.

In certain embodiments, an axial position of a focus of the light beam is adjusted by the first modulation pattern and/or the second modulation pattern.

In certain embodiments, the wavefront of the light beam is modulated in an identical fashion by the first modulation pattern and the second modulation pattern regardless of the polarization of the light beam.

In certain embodiments, a light distribution comprising a local intensity minimum at a focus of the light beam is generated by the first modulation pattern and/or the second modulation pattern In certain embodiments, a light distribution comprising a local intensity maximum at the focus, particularly a Gaussian shaped light distribution, is generated by the first modulation pattern and a light distribution comprising the local intensity minimum at the focus, particularly a donut-shaped light distribution or a bottle beam shaped light distribution, is generated by the second modulation pattern.

In certain embodiments, a first light distribution is generated by the first modulation pattern and a second light distribution is generated by the second modulation pattern, wherein both the first light distribution and the second light distribution comprise a local minimum at the focus, wherein the first light distribution is different from the second light distribution, wherein particularly the first light distribution is donut-shaped and the second light distribution is bottle beam shaped.

In certain embodiments, the first light distribution and the second light distribution each comprise a low-intensity region including and/or surrounding the local intensity minimum, wherein a light intensity is below a threshold value in the low-intensity region, and wherein a volume of the low-intensity region of the first light distribution is different, particularly by 10% or more, from the volume of the low-intensity region of the second light distribution.

In certain embodiments, the at least one of the first light distribution and the second light distribution comprises additional light intensity at the local minimum.

Further favorable embodiments of the method and the microscope according to the disclosure have already been mentioned in the context of the light modulation device according to the disclosure.

SHORT DESCRIPTION OF THE FIGURES

The disclosure is further elucidated and described hereafter with reference to the exemplary embodiments displayed in the figures. These embodiments are non-restrictive examples which are not meant to limit the scope of the disclosure.

FIG. 1A-B shows a first embodiment of the light modulation device comprising a single spatial light modulator comprising two active areas of identical polarization sensitivity and a polarization modifying element;

FIG. 2A-B shows a second embodiment of the light modulation device comprising two spatial light modulators comprising active areas of orthogonal polarization sensitivities;

FIG. 3A-B shows a third embodiment of the light modulation device comprising two transmissive phase filters having the same polarization sensitivity and a polarization modifying element;

FIG. 4A-B shows a fourth embodiment of the light modulation device comprising two transmissive phase filters having orthogonal polarization sensitivities;

FIG. 5 shows a first embodiment of the microscope;

FIG. 6 shows a second embodiment of the microscope, particularly a MINFLUX microscope;

FIG. 7 shows an embodiment of a first polarization switching element comprising a polarizing beam splitter and two acousto-optic modulators;

FIG. 8 shows a further embodiment of the light modulation device comprising an electrooptic modulator and a wavefront modulator in a single pass configuration;

FIG. 9 shows a further embodiment of the light modulation device comprising an electrooptic modulator and a wavefront modulator in a double pass configuration.

DESCRIPTION OF THE FIGURES

FIG. 1 shows a first embodiment of the light modulation device 1 according to the present disclosure.

Figure 1A:
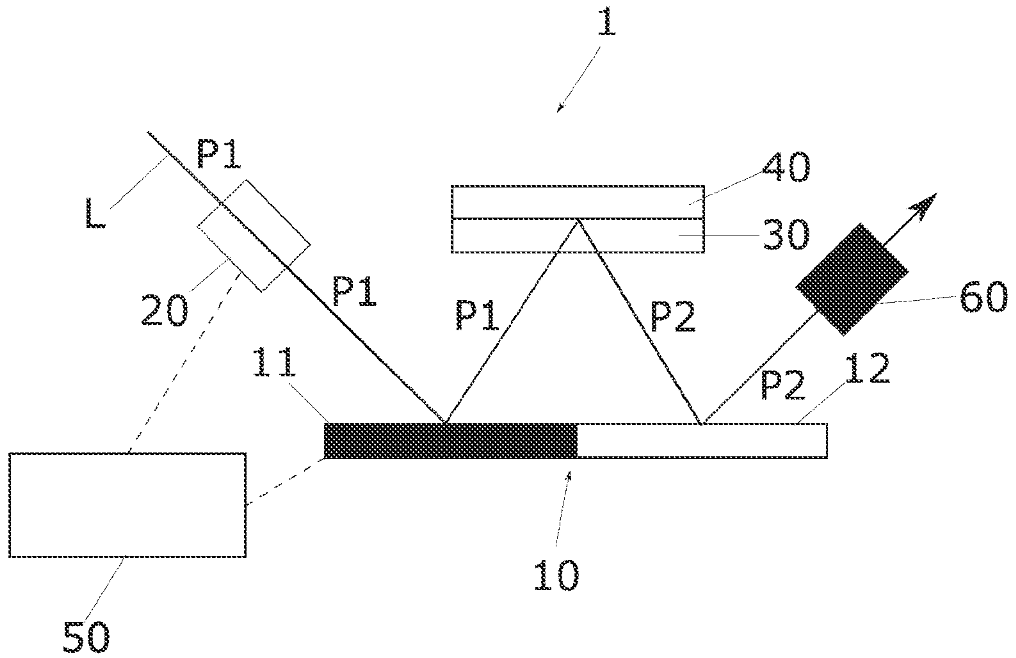
FIG. 1A and FIG. 1B show alternative states of the light modulation device 1.

The light modulation device 1 comprises a wavefront modulator 10, particularly a spatial light modulator with a plurality of pixels having programmable phase values (retardance values). A blazed grating is encoded by the pixels of the spatial light modulator to diffract the light beam L while modulating the phase distribution of the light beam L (particularly the first order diffracted beam). For instance, such spatial light modulators may operate based on birefringent nematic liquid crystals which can be oriented by an electric field. An active, light-modulating surface of the spatial light modulator comprising the programmable pixels is divided into a first active area 11 and a second active area 12 which may display separate phase patterns, for example. The wavefront modulator 10 is connected to a control device 50 which may be configured to adjust the retardance values of the pixels to display variable phase patterns on the first active area 11 and the second active area 12. According to the example depicted in FIG. 1, both the first active area 11 and the second active area 12 have the same polarization sensitivity in the first polarization direction P1. In other words, only light which is polarized in the first polarization direction P1 is wavefront-modulated.

The light beam L, which is initially linearly polarized in the first polarization direction P1, passes through a first polarization switching element 20 (e.g., a Pockels cell) connected to the control device 50. In FIG. 1A, the first polarization switching element 20 is inactive, such that the polarization of the light beam L is not rotated by the first polarization switching element 20. Thus, the light beam L is still linearly polarized in the first polarization direction P1 when the light beam L hits the first active area 11. Consequently, the wavefront of the diffracted light beam L is modulated by the first active area 11 (schematically indicated by depicting the first active area 11 in solid black).

Subsequently, the diffracted light beam L is reflected by a reflective element 40 (e.g., a mirror) onto the second active area 12. A polarization modifying element 30, e.g., a λ/4 plate, is attached to the reflective element 40, and is passed twice by the light beam L between the first active area 11 and the second active area 12. Thereby, the polarization of the light beam L is rotated by 90° from the first polarization direction P1 to the second polarization direction P2. The polarization modifying element 30 may be chromatic, i.e., may rotate the polarization of a light beam L in a wavelength-dependent manner.

Since the second polarization direction P2 is orthogonal to the preferential polarization direction of the first and the second active area 11,12, the wavefront of the rotated light beam L is not further modulated by the second active area 12.

Figure 1B:
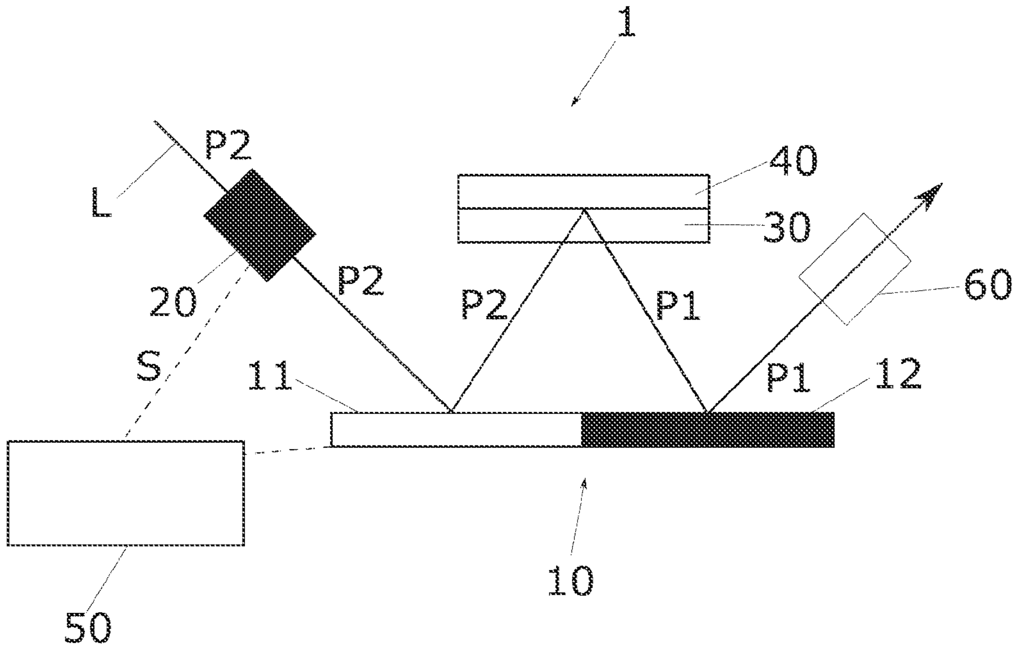

In the configuration shown in FIG. 1B, the first polarization switching element 20 receives a switching signal S from the control device 50, such that the first polarization switching element 20 rotates the polarization of the light beam L from the first polarization direction P1 to the second polarization direction P2. Activation of the first polarization switching element 20 is indicated in FIG. 1B by the solid black color of the symbol.

The polarization of the light beam L thus does not match the polarization selectivity of the wavefront modulator 10 when the light beam L reaches the first active area 11, and consequently, the wavefront of the light beam L is unaffected by the first active area 11. By rotation by the polarization modifying element 30, however, the light beam L is subsequently polarized in the first polarization direction P1 when the light beam L reaches the second active area 12. Therefore, the wavefront of the light beam L is modulated by the second active area 12.

An optional second polarization switching element 60 (e.g., a second Pockels cell) may be provided in the light path after the wavefront modulator 10 to rotate the polarization of the light beam L back to the first polarization direction P1, e.g., in case the polarization is important for downstream applications. Triggering of the second polarization switching element 60 may be synchronized with the activation of the first polarization switching element 20.

Figure 2A:
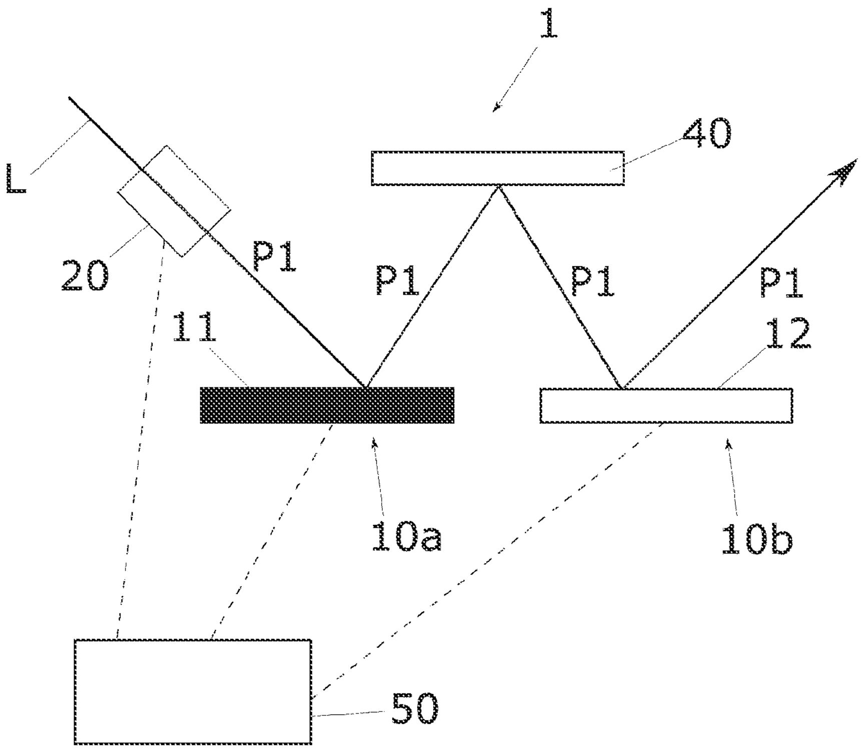
Figure 2B:
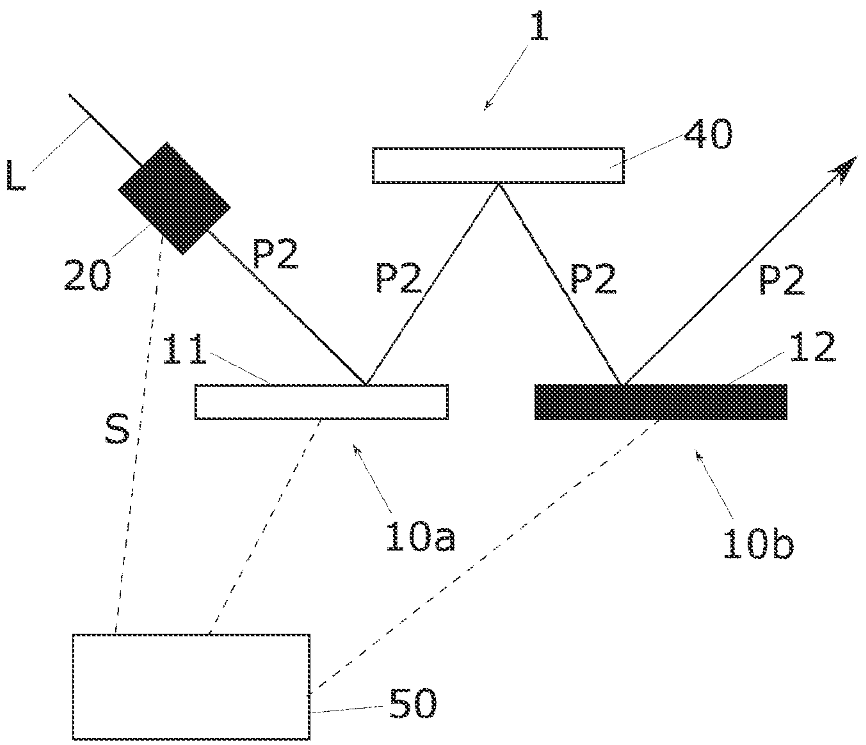

FIG. 2 illustrates a second embodiment of the disclosure, which differs from the first embodiment (see FIG. 1) in that the first active area 11 is provided by a first wavefront modulator 10*a* and the second active area 12 is provided by a second wavefront modulator 10*b*. FIG. 2A and FIG. 2B show different configurations of the light modulating device 1.

Therefore, the first active area 11 and the second active area 12 can be easily set to different, particularly orthogonal, polarization sensitivities. According to the example shown in FIG. 2, the first active area 11 is configured to modulate the wavefront of a light beam L polarized in the first polarization direction P1 and the second active area 12 is configured to modulate the wavefront of a light beam L polarized in the second polarization direction P2. Thus, the polarization modifying element 30 shown in FIG. 1 may be omitted in the embodiment according to FIG. 2 as explained below.

In the situation depicted in FIG. 2A, the light beam L is not rotated by the first polarization switching element 20 and is thus polarized in the first polarization direction P1 when it reaches the first active area 11. Accordingly, the wavefront light beam L is modulated by the first active area 11.

After being diffracted by the first active area 11, the light beam L is reflected onto the second active area 12 by the reflective element 40 which is not attached to a polarization modifying element 30 in contrast to the embodiment shown in FIG. 1.

When reaching the second active area 12, the light beam L is still polarized in the first polarization direction P1. Since the preferential direction of the second active area 12 is the second polarization direction P2 which is orthogonal to the first polarization direction P1, the second active area does not modulate the wavefront of the light beam L.

By providing a switching signal S to the polarization switching element 20 (see FIG. 2B), the polarization of the light beam L is rotated to the second polarization direction P2 and the situation is reversed: The wavefront of the light beam L is not affected by the first active area 11 but is modulated by the second active area 12.

Figure 3A:
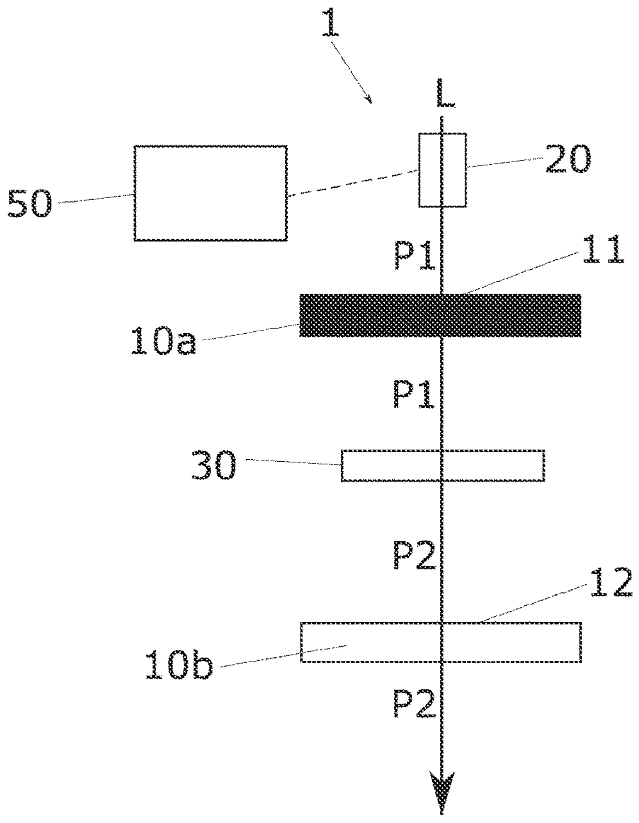
Figure 3B:
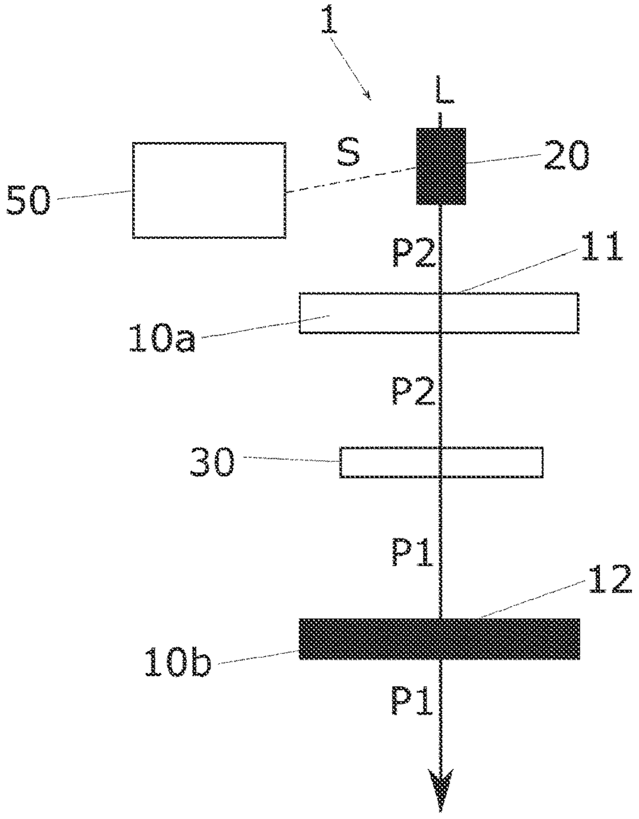

In FIG. 2, as well as in FIG. 3 and FIG. 4 described below, the first polarization switching element 20 in the activated state and the first and second active areas 11,12 modulating the wavefront of the light beam L are highlighted in black.

FIG. 3 and FIG. 4 illustrate further embodiments of the light modulation device 1 according to the disclosure, in which the first active area 11 and the second active area 12 are comprised in a first and a second transmissive wavefront modulator 10*a*, 10*b*.

According to the embodiment depicted in FIG. 3, the first active area 11 and the second active area 12 have the same polarization sensitivity in the first polarization direction P1, and a polarization modifying element 30, e.g., a λ/2 plate, is arranged between the first wavefront modulator 10*a* and the second wavefront modulator 10*b* to rotate the polarization of the light beam L from the first polarization direction P1 to the second polarization direction P2.

Hence, if the polarization switching element 20 is inactive (FIG. 3A), the first active area 11, but not the second active area 12, modulates the wavefront of the light beam L, and if the polarization switching element 20 is activated by a switching signal S from the control device 50 (FIG. 3B), the second active area 12, but not the first active area 11 modulates the wavefront of the light beam (L).

In FIG. 4, an analogous setup is shown without the polarization modifying element 30 in the light path between the first active area 11 and the second active area 12. According to this embodiment, the first active area 11 selectively modulates the wavefront of a light beam L polarized in the first polarization direction P1 and the second active area 12 selectively modulates the wavefront of a light beam L polarized in the second polarization direction P2.

Figure 4A:
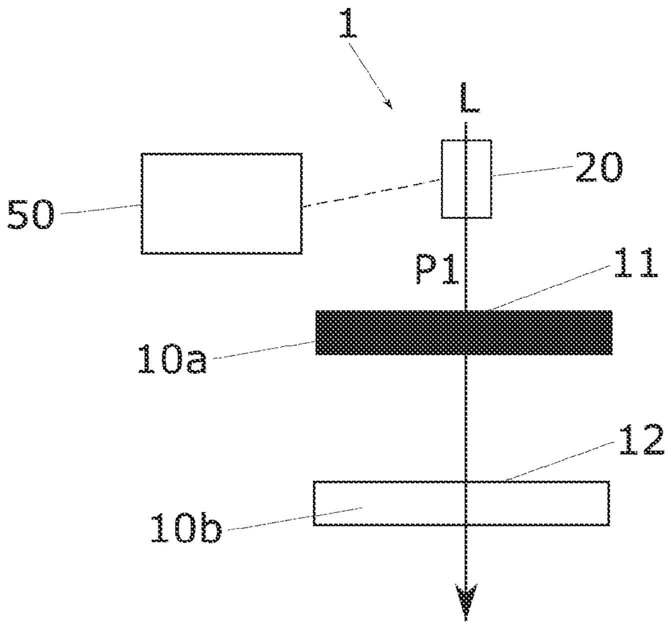
Figure 4B:
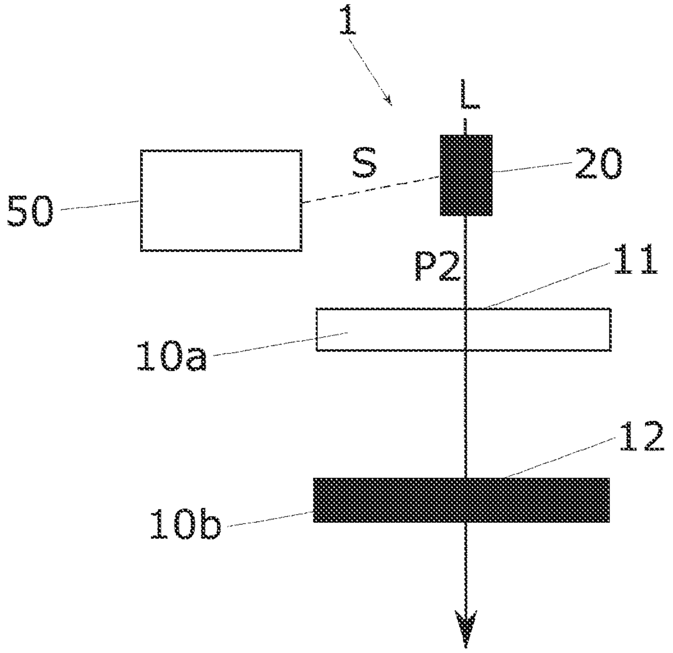

Hence, as shown in FIG. 4A, the light beam L is wavefront-modulated by the first active area 11 in the inactive state of the polarization switching element 20 (FIG. 4A) and the light beam L is wavefront-modulated by the second active area 12 in the activated state of the polarization switching element 20 (FIG. 4B).

Figure 5:
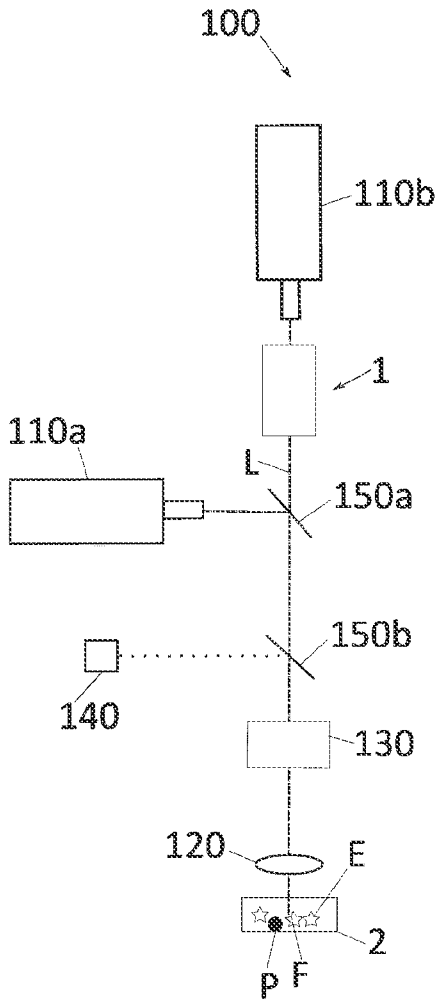
Figure 6:
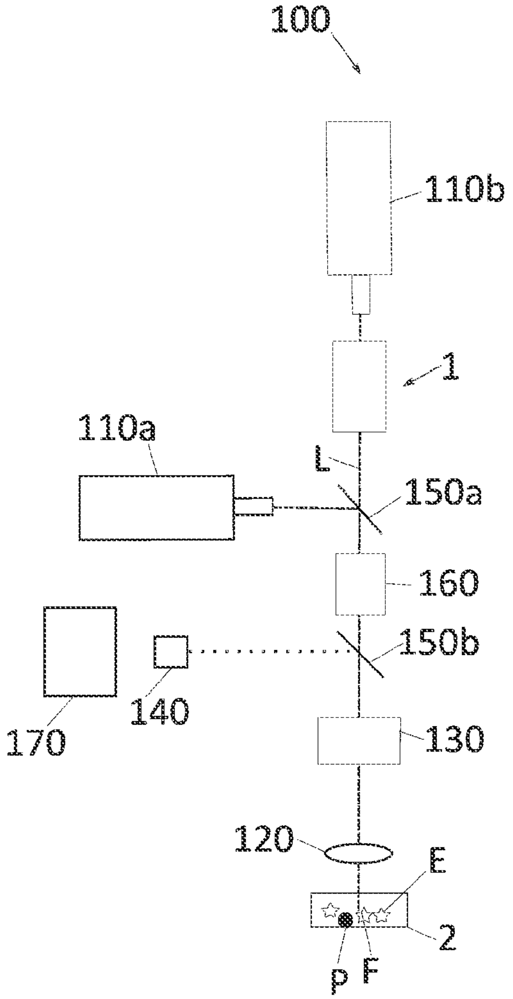

FIG. 5 and FIG. 6 show generalized examples of microscopes 100 according to the disclosure incorporating a light modulation device 1 according to the disclosure. In particular, the microscope 100 shown in FIG. 5 may be a STED microscope or a RESOLFT microscope, and the microscope 100 depicted in FIG. 6 may be a MINFLUX microscope.

The microscope 100 shown in FIG. 5 comprises a first light source 110*a* and an optional second light source 110*b* generating a light beam L coupled into a common beam path by a first beam splitter 150*a*. A polarizer may be provided to linearly polarize the light beam L (not shown).

The light beam L is then wavefront-modulated by a light modulation device 1 according to the disclosure (depicted highly schematically, see FIGS. 1 to 4 for details) in the beam path of the microscope 100, as described above.

Subsequently, the wavefront-modulated light beam L is passed through a second beam splitter 150*b* (e.g., a dichroic mirror) and via a scanner 130 (e.g., a galvanometric scanner) into an objective lens 120, which generates a focus F of the light beam L in a sample 2 containing particles P and/or emitters E (e.g., fluorophores). The focus F of the light beam L is scanned through or over the sample by the scanner 130.

The first light source 110*a* may generate excitation light capable of exciting the emitters E in the sample, such that they emit luminescence, particularly fluorescence light. This light is picked up by the objective lens 120, separated, particularly in a wavelength-dependent manner, from the excitation light by the second beam splitter 150*b* and detected by a detector 140 (particularly a confocal point detector or array detector, optional confocal pinhole not shown).

The optional second light source 110*b* may generate, e.g., STED light used to de-excite the emitters E outside of a central narrow region of the focus F for improving the resolution of the microscope 100 beyond the diffraction limit.

In particular, the light modulation device 1 may be used to shape the focus F of the STED light beam into a light intensity distribution with a (central) local minimum, such as e.g., a 2D donut or a 3D donut (bottle beam). More particularly, fast switching between different STED beam shapes (such as a 2D donut and a 3D donut) may be mediated by sending a switching signal S to the control device 50 of the light modulation device 1 as described above and illustrated in FIGS. 1 to 4.

Another possible application of the light modulation device 1 is fast switching between a regular STED donut and a donut with additional light intensity at the minimum, which can be used for background correction.

Yet alternatively, the light modulation device 1 may be used in the microscope 100 to shift an axial position of the focus F of the excitation light and/or the STED light between two pre-defined positions (by introducing a defocus on at least one of the active areas of the wavefront modulator(s)). This may be used in combination with the scanner 130 for 3D scanning of the sample 2.

FIG. 6 shows a microscope 100 which is specifically adapted for MINFLUX or STED-MINFLUX microscopy. Components described above are labeled with the same reference signs as in FIG. 5. The second light source 110*b* is optional and may generate additional STED light, e.g., to move a STED light distribution comprising a minimum over or through the sample in a pattern while detecting light intensities or photon counts of the light emitted by a single fluorophore (a method designated herein as 'STED-MINFLUX'), or to provide an envelope of STED light to reduce background emission, while the excitation light distribution with a local minimum is moved over or through the sample in a pattern while detecting photon counts or emission light intensities (MINFLUX in a STED envelope).

In addition to the components depicted in FIG. 5, the microscope 100 comprises a deflection device 160 (e.g., an electro optic deflector) configured to move the excitation light distribution and/or the STED light laterally over or through the sample 2 in a pattern to localize a single emitter E, and a processing device 170 configured to determine a position estimate of the localized emitter E based on the photon counts/detection light intensities and the corresponding positions of the excitation light distribution and/or STED light distribution.

The light modulation device 1 may be used, e.g., to switch between different shapes of the excitation light or STED light focus. To this end, the light modulation device may be arranged either in the beam path of the first light source 110*a*, the second light source 110*b* (as depicted in FIG. 6) or in the common beam path of the first light source 110*a* and the second light source 110*b*, i.e., after the first beam splitter 150*a*.

One possible application of the light modulation device 1 is fast switching between a Gaussian shaped excitation focus for lower-accuracy pre-localization of the emitter E and a 2D donut or 3D donut of the excitation light for high-accuracy MINFLUX localization of the pre-localized emitter E. This is possible without the optional second light source 110*b* configured to generate STED light.

Another possibility is fast switching between STED light envelopes of different broadness (i.e., different steepness of the intensity increase flanking the central intensity minimum) to adapt the background reduction to the MINFLUX sequence which is executed in parallel using the excitation light distribution.

Figure 7:
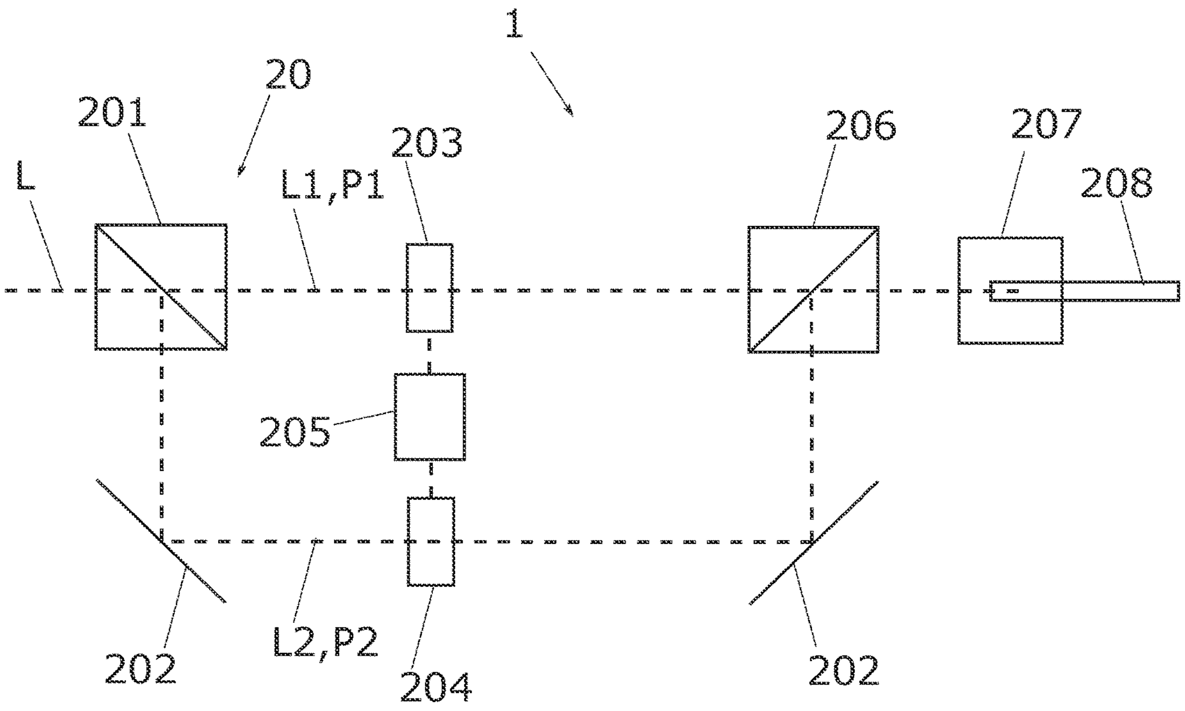

FIG. 7 shows an embodiment of a light modulation device 1 with a first polarization switching element 20 comprising a polarizing beam splitter 201, two mirrors 202, a first acousto-optic modulator 203, a second acousto-optic modulator 204, a control device 205, and a polarizing beam combiner 206.

A light beam L is split up into a first light beam L1 having a first polarization direction P1 and a second light beam L2 having a second polarization direction P2 perpendicular to the first polarization direction P1 by the polarizing beam splitter 201. The first light beam L1 is modulated by the first acousto-optic modulator 203, and the second light beam L2 is modulated by the second acousto-optic modulator 204. The first acousto-optic modulator 203 and the second acousto-optic modulator 204 are connected to the control device 205 that is configured to switch between a first state, in which the first light beam L1 is blocked by the first acousto-optic modulator 203, and the intensity of the second light beam L2 is left unaffected by the second acousto-optic modulator 204 and a second state, in which the intensity of the first light beam L1 is left unaffected by the first acousto-optic modulator 203 and the second light beam L2 is blocked by the second acousto-optic modulator 204. The second light beam L2 is guided by mirrors 202 to the polarizing beam combiner 206 in the beam path of the first light beam L1, which combines both light beams L1, L2 into a common beam path. An optional fiber coupler 207 is arranged in the subsequent common beam path. The fiber coupler 207 couples the first light beam L1 or the second light beam L2 into an optical fiber 208.

Figure 8:
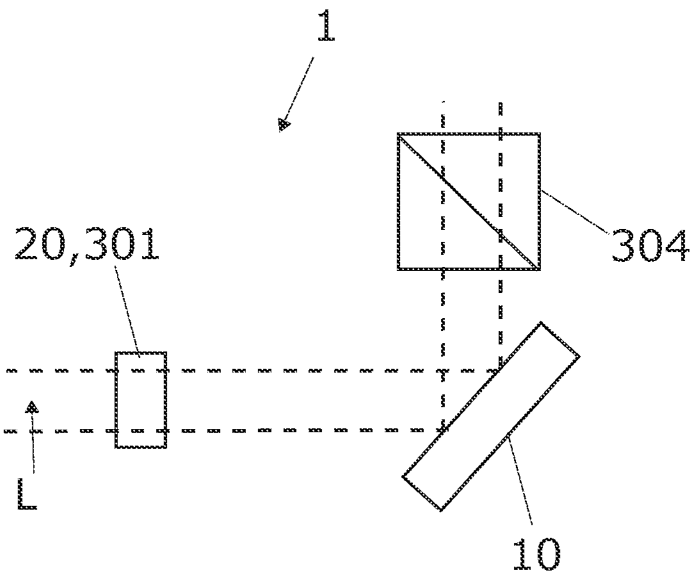

FIG. 8 shows an embodiment of the light modulation device 1 comprising a first polarization switching element 20, which is a first electrooptical modulator 301, and a wavefront modulator 10 in a single-pass configuration. For example, the wavefront modulator 10 may be a liquid crystal-based programmable spatial light modulator which modulates the spatial phase distribution of the light beam L.

The incoming light beam L is linearly polarized in a polarization direction arranged at an angle of 45° with respect to a modulation axis of the first electrooptical modulator 301, such that the first electrooptical modulator 301 introduces a phase shift to a first polarization component of the light beam L but leaves a second polarization component perpendicular to the first polarization component unaffected. The phase shift may be variable depending on a voltage applied to the first electrooptical modulator 301. A principal axis of the wavefront modulator 10 may be oriented parallel to the initial polarization direction and at 45° to the modulation axis of the first electrooptical modulator 301. The wavefront modulator 10 may be configured such that first pixels act as a polarization rotator rotating the polarization direction of the light beam L by 90°, whereas second pixels are inactive, e.g., just reflect or diffract the incoming light.

The light modulation device 1 further comprises a polarizer 304 which is configured to separate the orthogonal polarization components of the light beam L, such that for part of the beam modulated by the first pixels the phase shifted polarization component is transmitted and for the part of the beam impinging on the second pixels, the unshifted polarization component is transmitted. These components may then form a desired intensity distribution by interference when focused by an objective lens.

For example, an annular phase pattern comprising an outer ring (example of a first active area 11) and an inner disk (example of a second active area 12) with a phase difference, e.g. of 180°, may be displayed by the wavefront modulator 303. In this case, the two components will interfere to form a so-called bottle beam (sometimes also termed 3D donut) with a central intensity minimum at the focus. For example, an axial position of the minimum may be adjusted by adjusting the phase shift introduced by the first electrooptical modulator 301, i.e. by adjusting the voltage applied to the first electrooptical modulator 301 gradually or stepwise. In this manner, the arrangement shown in FIG. 8 may be used for focusing, e.g., in a 3D MINFLUX localization or tracking experiment.

Figure 9:
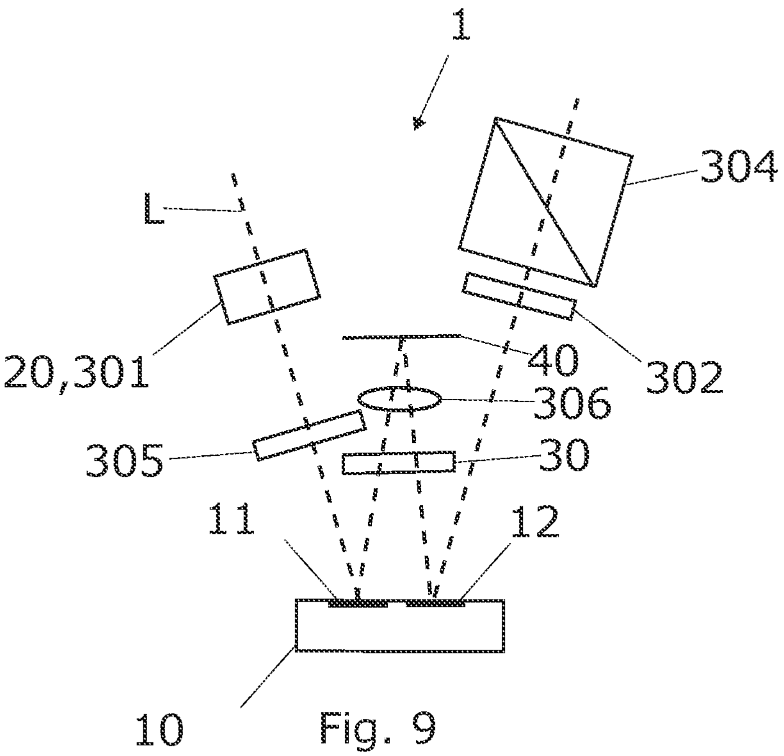

FIG. 9 shows a further embodiment of a light modulation device 1 comprising a first polarization switching element 20 which is a first electrooptical modulator 301 with a modulation axis oriented at 45° to an initial polarization direction of the light beam L, a quarter wave plate 305 oriented parallel to the initial polarization direction (i.e., at 45° with respect to the modulation axis of the first electrooptical modulator 301), a wavefront modulator 10 in a double pass configuration, a halfwave plate 302 oriented at 22.5° with respect to the initial polarization direction of the light beam L, and a polarizer 304.

For example, the wavefront modulator 10 may be a liquid crystal-based programmable spatial light modulator which modulates the spatial phase distribution of the light beam L.

After being reflected or diffracted from the first active area 11 of the wavefront modulator 10 the light beam L is imaged onto the second active area 12 of the same wavefront modulator 10 by means of a lens 306 and a reflective element 40 (e.g., a mirror). By passing a polarization modifying element 30 (e.g., a quarter wave plate) twice, the polarization of the light beam L is rotated by 90°, such that the first active area 11 and the second active area 12 act on orthogonal polarization components of the light beam L. The lens 306 is optional. A similar double pass arrangement with a compact arrangement of a quarter wave plate and a mirror has been described in the prior art. Using the components shown in FIG. 9, when focusing the phase modulated light beam, two different light distributions may be combined interferometrically by displaying the corresponding phase patterns on the first active area 11 and the second active area 12. For example, a bottle beam and a Gaussian focus may be combined to generate an axially shifted bottle beam, which can be used for focusing/axial displacement, e.g. in a 3D MINFLUX method.

By means of the first electrooptical modulator 301 and the quarter wave plate 305, a relative amplitude between two orthogonal polarization components of the light beam L may be adjusted depending on the voltage applied to the first electrooptical modulator 301. These components are separately phase modulated by the wavefront modulator 20, rotated by 45° by the half wave plate 302, and finally combined by the polarizer 304, such that they interfere with each other.

In the example, in which a Gaussian focus is combined with a bottle beam to adjust the axial position of the central intensity minimum of the bottle beam, the voltage applied to the first electrooptical modulator 301 may be adjusted gradually or stepwise to adjust the relative amplitude of the polarization components.

LIST OF REFERENCE SIGNS

1 Light modulation device
2 Sample
10 Wavefront modulator
10*a* First wavefront modulator
10*b* Second wavefront modulator
11 First active area
12 Second active area
20 First polarization switching element
30 Polarization modifying element
40 Reflective element
50 Control device
60 Second polarization switching element
100 Microscope
110 Light source
110*a* First light source
110*b* Second light source
120 Objective lens
130 Scanner
140 Detector
150*a* First beam splitter
150*b* Second beam splitter
160 Deflection device
170 Processing device
201 Polarizing beam splitter
202 Mirror
203 First acoustooptic modulator
204 Second acoustooptic modulator
205 Control device
206 Polarizing beam combiner
207 Fiber coupler
208 Optical fiber
301 First electrooptic modulator
302 Halfwave plate
304 Polarizer
305 Quarter wave plate
306 Lens
E Emitter
F Focus
P Particle
L Light beam
L1 First light beam
L2 Second light beam
P1 First polarization direction
P2 Second polarization direction
S Switching signal

The invention claimed is:

1. A light modulation device for a microscope comprising a first active area of a wavefront modulator and a second active area of a wavefront modulator, wherein the first active area and the second active area are configured to modulate a wavefront of a light beam dependent on a polarization of the light beam, wherein a light path, along which the light beam propagates, intersects the first active area and the second active area, wherein the light modulation device comprises a first polarization switching element configured to rotate the polarization of the light beam between a first polarization direction and a second polarization direction upon receiving a switching signal to selectively modulate the wavefront of the light beam by the first active area and/or the second active area, wherein the first active area is configured to display a first modulation pattern and the second active area is configured to display a second modulation pattern, wherein the first modulation pattern is adapted to generate a first light distribution, and the second modulation pattern is adapted to generate a second light distribution, wherein both the first light distribution and the second light distribution comprise a local minimum at a focus of the light beam, and wherein the first light distribution is different from the second light distribution.

2. The light modulation device according to claim 1, wherein the light beam is linearly polarized.

3. The light modulation device according to claim 1, wherein the first active area is configured to modulate the wavefront of the light beam if the light beam is polarized in the first polarization direction and the second active area is configured to modulate the wavefront of the light beam if the light beam is polarized in the second polarization direction.

4. The light modulation device according to claim 1, wherein the light modulation device comprises a polarization modifying element configured to rotate the polarization of the light beam wherein the polarization modifying element is arranged in the light path between the first active area and the second active area.

5. The light modulation device according to claim 4, wherein the polarization modifying element is configured to rotate the polarization of the light beam in a wavelength dependent manner.

6. The light modulation device according to claim 4, wherein both the first active area and the second active area are configured to modulate the wavefront of the light beam if the light beam is polarized in the first polarization direction or both the first active area and the second active area are configured to modulate the wavefront of the light beam if the light beam is polarized in the second polarization direction.

7. The light modulation device according to claim 6 wherein the first active area and the second active area are jointly formed by a single wavefront modulator.

8. The light modulation device according to claim 1, wherein the light modulation device comprises a second polarization switching element configured to rotate the polarization of the light beam between the second polarization direction and the first polarization direction after the wavefront of the light beam has been modulated by the first active area and the second active area.

9. The light modulation device according to claim 8, wherein the first polarization switching element and/or the second polarization switching element comprises a switching rate of at least 1 KHz.

10. The light modulation device according to claim 1, wherein the light modulation device comprises a control device configured to control the first active area and the second active area, such that the first active area displays the first modulation pattern and the second active area displays the second modulation pattern.

11. The light modulation device according to claim 1, wherein the first modulation pattern and the second modulation pattern are adapted to adjust an axial position of a focus of the light beam.

12. The light modulation device according to claim 1, wherein the first light distribution and the second light distribution each comprise a low-intensity region including and/or surrounding the local intensity minimum, wherein a light intensity is below a threshold value in the low-intensity region, and wherein a volume of the low-intensity region of the first light distribution is different from the volume of the low-intensity region of the second light distribution.

13. The light modulation device according to claim 1, wherein the at least one of the first light distribution and the second light distribution comprises additional light intensity at the local minimum.

14. A microscope comprising a light modulation device according to claim 1.

15. The microscope according to claim 14, wherein the microscope is a MINFLUX microscope.

16. A method for modulating a light beam for microscopy using the light modulation device according to claim 1, wherein a. a light beam is provided b. the light beam is directed along a light path intersecting a first active area of a wavefront modulator and a second active area of a wavefront modulator, wherein the first active area and the second active area are configured to modulate a wavefront of the light beam dependent on a polarization of the light beam, wherein the polarization of the light beam is rotated between a first polarization direction and a second polarization direction upon receiving a switching signal to selectively modulate the wavefront of the light beam by the first active area and/or the second active area.

17. The light modulation device according to claim 1, wherein the first polarization switching element comprises a switching rate of at least 1 KHz.

* * * * *